US011496198B2

(12) United States Patent
Liu et al.

(10) Patent No.: US 11,496,198 B2
(45) Date of Patent: Nov. 8, 2022

(54) CHANNEL MEASUREMENT METHOD AND USER EQUIPMENT

(71) Applicant: HUAWEI TECHNOLOGIES CO., LTD., Guangdong (CN)

(72) Inventors: Xianda Liu, Beijing (CN); Kunpeng Liu, Beijing (CN); Zukang Shen, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 465 days.

(21) Appl. No.: 16/248,177

(22) Filed: Jan. 15, 2019

(65) Prior Publication Data
US 2019/0181939 A1 Jun. 13, 2019

Related U.S. Application Data

(63) Continuation of application No. PCT/CN2018/083622, filed on Apr. 18, 2018.

(30) Foreign Application Priority Data

Dec. 9, 2017 (CN) .......................... 201711299706.2
Dec. 12, 2017 (CN) .......................... 201711322872.X

(51) Int. Cl.
H04K 1/10 (2006.01)
H04L 27/28 (2006.01)
(Continued)

(52) U.S. Cl.
CPC ......... *H04B 7/0639* (2013.01); *H04B 7/0478* (2013.01); *H04B 7/0486* (2013.01); *H04L 27/2607* (2013.01); *H04L 5/0007* (2013.01)

(58) Field of Classification Search
CPC . H04B 7/0639; H04B 7/0486; H04L 27/2607; H04L 5/0007; H04W 72/042
(Continued)

(56) References Cited

U.S. PATENT DOCUMENTS

2007/0270170 A1 11/2007 Yoon et al.
2010/0278059 A1 11/2010 Wu et al.
(Continued)

FOREIGN PATENT DOCUMENTS

CN 101388752 A 3/2009
CN 102083223 A 6/2011
(Continued)

OTHER PUBLICATIONS

U.S. Appl. No. 62/593,478, filed Dec. 1, 2017.*
(Continued)

*Primary Examiner* — Phuong Phu
(74) *Attorney, Agent, or Firm* — Fish & Richardson P.C.

(57) ABSTRACT

The present disclosure describes methods, device, system that provide a codebook indication operation. In one example, a codebook indication method includes: receiving by a terminal device, a transmission parameter indication information indicating an index of one codebook subset configuration of three codebook subset configurations in the terminal device from a base station, wherein the three codebook subset configurations in the terminal device are related to fully coherent, partial coherent, and incoherent respectively, and the codebook subset configuration related to fully coherent includes M indexes, the codebook subset configuration related to partial coherent includes N indexes, and the codebook subset configuration related to incoherent includes K indexes, wherein M is an integer larger than N, and N is larger than K; and determining a transmission layer and precoding matrix associated with the index according to the transmission parameter indication information.

8 Claims, 3 Drawing Sheets

(51) Int. Cl.
  *H04B 7/06* (2006.01)
  *H04L 27/26* (2006.01)
  *H04B 7/0456* (2017.01)
  *H04L 5/00* (2006.01)
(58) Field of Classification Search
  USPC .................. 375/260, 219, 220, 295, 316
  See application file for complete search history.

(56) References Cited

U.S. PATENT DOCUMENTS

| | | | |
|---|---|---|---|
| 2013/0114656 | A1 | 5/2013 | Sayana et al. |
| 2013/0272250 | A1 | 10/2013 | Shimezawa et al. |
| 2013/0322376 | A1 | 12/2013 | Marinier et al. |
| 2014/0179334 | A1 | 6/2014 | Forenza et al. |
| 2014/0269502 | A1 | 9/2014 | Forenza et al. |
| 2015/0071367 | A1 | 3/2015 | Hwang et al. |
| 2015/0244438 | A1 | 8/2015 | Ding et al. |
| 2016/0233938 | A1 | 8/2016 | Mondal et al. |
| 2018/0183503 | A1* | 6/2018 | Rahman .............. H04W 72/042 |

FOREIGN PATENT DOCUMENTS

| | | |
|---|---|---|
| CN | 103444220 A | 12/2013 |
| CN | 103580821 A | 2/2014 |
| CN | 103918195 A | 7/2014 |
| CN | 104426635 A | 3/2015 |
| CN | 104584450 A | 4/2015 |
| CN | 104702543 A | 6/2015 |
| CN | 105933042 A | 9/2016 |
| CN | 107241129 A | 10/2017 |
| CN | 107431600 A | 12/2017 |
| EP | 3562052 A1 | 10/2019 |
| JP | 2009525665 A | 7/2009 |
| JP | 2009545193 A | 12/2009 |
| JP | 2016048949 A | 4/2016 |
| KR | 20080109812 A | 12/2008 |
| KR | 20120044530 A | 5/2012 |

OTHER PUBLICATIONS

R1-1721399 Samsung,"Codebook-based UL transmission",3GPP TSG RAN WG1 Meeting #91,Reno, USA, Nov. 27-Dec. 1, 2017,total 3 pages.
R1-1800479 OPPO,"Text proposal for codebook based UL transmission", 3GPP TSG RAN WG1 Meeting AH 1801, Vancouver, Canada, Jan. 22-26, 2018,total 6 pages.
3GPP TS 38.214 V1.2.0 (Nov. 2017),3rd Generation Partnership Project;Technical Specification Group Radio Access Network;NR;Physical layer procedures for data (Release 15),total 55 pages.
3GPP TS 38.212 V1.0.0 (Sep. 2017),3rd Generation Partnership Project;Technical Specification Group Radio Access Network;NR;Multiplexing and channel coding(Release 15),total 28 pages.
3GPP TS 36.214 V15.0.0 (Sep. 2017),3rd Generation Partnership Project;Technical Specification Group Radio Access Network;Evolved Universal Terrestrial Radio Access (E-UTRA);Physical layer;Measurements(Release 15),total 23 pages.
3GPP TS 38.211 V1.2.0 (Nov. 2017),3rd Generation Partnership Project;Technical Specification Group Radio Access Network;NR;Physical channels and modulation(Release 15),total 59 pages.
3GPP TS 36.211 V14.4.0 (Sep. 2017),3rd Generation Partnership Project;Technical Specification Group Radio Access Network;Evolved Universal Terrestrial Radio Access (E-UTRA);Physical channels and modulation(Release 14),total 197 pages.
3GPP TS 38.331 V0.1.0 (Oct. 2017)3rd Generation Partnership Project;Technical Specification Group Radio Access Network;NR; Radio Resource Control (RRC);Protocol specification(Release 15),total 154 pages.
R1-180xxxx MCC Support,"Draft Report of 3GPP TSG RAN WG1 #91 v0.1.0 (Reno, USA, Nov. 27-Dec. 1, 2017)",3GPP TSG RAN WG1 Meeting #92,Athens, Greece, Feb. 26-Mar. 2, 2018,total 3 pages.
International Search Report and Written Opinion issued in International Application No. PCT/CN2018/083622, dated Aug. 31, 2018, 9 pages.
Office Action issued in Chinese Application No. 201810853696.0 dated May 8, 2019, 5 pages.
Office Action issued in Chinese Application No. 201810854049.1 dated May 8, 2019, 9 pages.
Office Action issued in Chinese Application No. 201810854049.1 dated Feb. 3, 2020, 2 pages.
Search Report issued in Chinese Application No. 201810854049.1 dated Jan. 17, 2020, 3 pages (with English translation).
Issue Notification issued in Chinese Application No. 201810853696.0 dated Oct. 9, 2019, 3 pages.
Notice of Allowance issued in Chinese Application No. 201810853696.0 dated Oct. 9, 2019, 1 page.
Office Action issued in Korean Application No. 2020-7019006 dated Sep. 30, 2021, 4 pages (with English translation).
Ericsson et al., "Way Forward on NR4 Port UL MIMO Codebook For CP-OFDM," 3GPP TSG RAN WG1 #91 R1-1721600, Reno, USA, Nov. 27-Dec. 1, 2017, 8 pages.
Office Action issued in Japanese Application No. 2020-531500 dated Oct. 5, 2021, 7 pages (with English translation).
Session Fair (Samsung), "Chief's notes for AI 7.2 NR-MIMO [online]," 3GPP TSG RAN WG1 #91, R1-1721657, Reno, USA, Nov. 27-Dec. 1, 2017, 38 pages.
Ericsson, "Codebook based UL MIMO remaining details," 3GPP TSG-RAN WG1 #91, R1-1720731; Reno, USA, Nov. 27-Dec. 1, 2017, 24 pages.
Extended European Search Report issued in European Application No. 18886370.8 dated Apr. 15, 2020, 7 pages.

* cited by examiner

CHANNEL MEASUREMENT METHOD AND USER EQUIPMENT

CROSS-REFERENCE TO RELATED APPLICATIONS

This application is a continuation of International Application No. PCT/CN2018/083622, filed on Apr. 18, 2018, which claims priority to Chinese Patent Application No. 201711322872.X, filed on Dec. 12, 2017, which claims priority to Chinese Patent Application No. 201711299706.2, filed on Dec. 9, 2017, all of which are hereby incorporated by reference in their entireties.

TECHNICAL FIELD

Embodiments of the present invention relate to channel measurement technologies, and in particular, to a channel measurement method and user equipment.

BACKGROUND

New Radio (NR) of a fifth generation (5G) mobile communications technology supports a codebook-based uplink transmission mode. A base station may configure at least one sounding reference signal (SRS) resource through higher-layer signaling. User equipment (UE) sends an SRS on the SRS resource based on the SRS resource configured by the base station and indication signaling. The base station receives and measures the SRS sent by the user equipment. When the base station schedules the user equipment to send uplink data, the base station indicates an SRS resource indication (SRI), a transmission rank indication (TRI), and a transmission precoding matrix indication (TPMI) through downlink control information (DCI). The UE determines, according to the indication information, a quantity of transmission layers and a precoding manner that are used for sending data. The TRI and the TPMI may be jointly coded, in other words, a quantity of transmission layers and precoding matrix information can both be indicated by a state in one DCI field. The quantity of transmission layers may be selected from a set $\{1, 2, 3, 4\}$ and be indicated, and the TPMI is selected and indicated based on Table 1 to Table 4.

TABLE 1

Codebook of one-layer transmission

| Codebook index | One-layer transmission $\upsilon = 1$ | Minimum coherence capability |
| --- | --- | --- |
| 12-27 | NR downlink codebook configured to code words in Codebook mode = 1 and $O_1 = 2$ | Fully coherent |
| 4-11 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ | Partially coherent |
| 0-3 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ | Incoherent |

TABLE 2

Codebook of two-layer transmission

| Codebook index | Two-layer transmission $\upsilon = 2$ | Minimum coherence capability |
| --- | --- | --- |
| 6-9 | $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ | Partially coherent |
| 10-13 | $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ | |

TABLE 2-continued

Codebook of two-layer transmission

| Codebook index | Two-layer transmission $\upsilon = 2$ | Minimum coherence capability |
|---|---|---|
| 14-21 | NR downlink codebook configured to code words in Codebook mode = 1, $O_1$ = 2, and $i_{1,3}$ = 0 | Fully coherent |
| 0-3 | $\frac{1}{2}\begin{bmatrix} 1 & 0 \\ 0 & 1 \\ 0 & 0 \\ 0 & 0 \end{bmatrix}$ $\frac{1}{2}\begin{bmatrix} 1 & 0 \\ 0 & 0 \\ 0 & 1 \\ 0 & 0 \end{bmatrix}$ $\frac{1}{2}\begin{bmatrix} 1 & 0 \\ 0 & 0 \\ 0 & 0 \\ 0 & 1 \end{bmatrix}$ $\frac{1}{2}\begin{bmatrix} 0 & 0 \\ 1 & 0 \\ 0 & 1 \\ 0 & 0 \end{bmatrix}$ | Incoherent |
| 4-5 | $\frac{1}{2}\begin{bmatrix} 0 & 0 \\ 1 & 0 \\ 0 & 0 \\ 0 & 1 \end{bmatrix}$ $\frac{1}{2}\begin{bmatrix} 0 & 0 \\ 0 & 0 \\ 1 & 0 \\ 0 & 1 \end{bmatrix}$ | |

TABLE 3

Codebook of three-layer transmission

| Codebook index | Three-layer transmission $\upsilon = 3$ | Minimum coherence capability |
|---|---|---|
| 3-6 | NR downlink codebook configured to Codebook mode = 1-2, $O_1$ = 2, and {0,2} | Fully coherent |
| 1-2 | $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ | Partially coherent |
| 0 | $\frac{1}{2}\begin{bmatrix} 1 & 0 & 0 \\ 0 & 1 & 0 \\ 0 & 0 & 1 \\ 0 & 0 & 0 \end{bmatrix}$ | Incoherent |

TABLE 4

Codebook of four-layer transmission

| Codebook index | Four-layer transmission $\upsilon = 4$ | Minimum coherence capability |
|---|---|---|
| 3-6 | NR downlink codebook configured to Codebook mode = 1-2, $O_1$ = 2, $t_{1,1}$ = 0, and $t_{1,2}$ = 0 | Fully coherent |
| 1-2 | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | Partially coherent |
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | Incoherent |

For each rank, there are three types of coherence capabilities, and each type of coherence capability is corresponding to at least one precoding matrix. For example, in Table 1, 16 precoding matrices can be selected from for "fully coherent", eight precoding matrices may be selected from for "partially coherent", and four precoding matrices may be selected from for "incoherent". The UE reports three types of coherence capabilities. The base station indicates a codebook subset limitation through RRC signaling, and a codebook subset limitation is used to indicate a codebook selection range for the TPMI. The codebook subset limitation includes three states respectively indicating "fully coherent", "partially coherent", and "incoherent". A specific indication method is as follows: One state is used to indicate that a codebook set indicated by the TPMI includes a codebook corresponding to "fully coherent", a codebook corresponding to "partially coherent", and a codebook corresponding to "incoherent". Another state is used to indicate that a codebook set indicated by the TPMI includes a codebook corresponding to "partially coherent" and a codebook corresponding to "incoherent". The other state is used to indicate that a codebook set indicated by the TPMI includes a codebook corresponding to "incoherent". Only one of the three states can be indicated. If the UE reports a partially coherent transmission capability, the base station cannot indicate that the codebook set indicated by the TPMI includes the codebook corresponding to "fully coherent". If the UE reports an incoherent transmission capability, the base station cannot indicate that the codebook set indicated by the TPMI includes the codebook corresponding to "fully coherent" and the codebook corresponding to "partially coherent". In this way, a size of the field obtained by jointly coding the TRI and the TPMI changes based on indications of the three states.

Table 1 to Table 4 are corresponding to a case in which the user equipment has four-antenna transmission and uses a cyclic prefix-orthogonal frequency division multiplexing (CP-OFDM) waveform for sending data. When the user equipment has two-antenna transmission and uses a CP-OFDM waveform for sending data, a quantity of transmission layers is 1 or 2, and selection and indication of the TPMI are based on Table 5.

TABLE 5

Two-antenna codebook for a CP-OFDM waveform

| Codebook index | One-layer transmission | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

| Codebook index | Two-layer transmission | | | | | | | |
|---|---|---|---|---|---|---|---|---|
| 0-2 | $\frac{1}{\sqrt{2}}\begin{bmatrix}1&0\\0&1\end{bmatrix}$ | $\frac{1}{2}\begin{bmatrix}1&1\\1&-1\end{bmatrix}$ | $\frac{1}{2}\begin{bmatrix}1&1\\j&-j\end{bmatrix}$ | — | — | — | — | — |

When discrete Fourier transform-Spread-OFDM (DFT-S-OFDM) is used, the quantity of transmission layers can only be 1, and selection and indication of the TPMI are based on Table 6 when the user equipment has two-antenna transmission, selection and indication of the TPMI are based on Table 7 when the user equipment has four-antenna transmission. In addition, the network device may use a higher-layer signaling indication to limit the quantity of transmission layers, so as to limit the selection of a subset from a set of maximum quantities of transmission layers to indicate the quantity of transmission layers and to indicate the TPMI. This can reduce signaling overheads for indicating the quantity of transmission layers and the TPMI.

TABLE 6

Two-antenna codebook for a DFT-S-OFDM waveform

| Codebook index | One-layer transmission | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

TABLE 7

Four-antenna codebook for a DFT-S-OFDM waveform

| Codebook index | One-layer transmission | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\-1\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\-1\end{bmatrix}$ | $\frac{1}{2}\begin{bmatrix}1\\-j\\-j\\1\end{bmatrix}$ | — | — | — | — |

SUMMARY

Generally, user equipment (by way of example but not limitation, a terminal device such as a smartphone) sends an uplink reference signal (by way of example but not limitation, a sounding reference signal (SRS)). An access device (by way of example but not limitation, a base station) receives the uplink reference signal, performs uplink channel measurement based on the uplink reference signal, determines an uplink transmission parameter, and notifies user equipment of the uplink transmission parameter by using, by way of example but not limitation, downlink control information (DCI). The uplink transmission parameter may include, by way of example but not limitation, at least one of the following parameters: a channel quality indicator (CQI), a rank indication (RI), or a precoding matrix indicator (PMI).

In the technical solutions provided in embodiments of the present invention, a transmission parameter entry set is used to organize transmission parameters. Specifically, each coherence capability is corresponding to one transmission parameter entry set. When determining a required transmission parameter entry (a transmission parameter entry indicated by transmission parameter indication information), the access device may traverse each transmission parameter entry in a transmission parameter entry set corresponding to a current coherence capability, and determine a selected transmission parameter entry according to a principle of, by way of example but not limitation, channel capacity maximization or channel throughput maximization.

For a specific process of determining the foregoing information, refer to the prior art. For example, the access device may select a precoding matrix from a preset codebook according to the channel capacity maximization principle or the channel throughput maximization principle, and use a quantity of columns of the precoding matrix as a rank.

According to a first aspect, a transmission parameter indication method is provided, including:

generating transmission parameter indication information, wherein the transmission parameter indication information is used to indicate a transmission parameter entry selected from a transmission parameter entry set corresponding to a current coherence capability, and the transmission parameter entry is used to indicate a quantity of transmission layers and a precoding matrix; and sending a transmission parameter indication information.

The transmission parameter indication method may be performed by an access device (such as a base station).

The selected transmission parameter entry may be sent by using DCI.

With reference to the first aspect, in a first possible implementation of the first aspect, the transmission parameter entry includes an index of the transmission parameter entry, a value of the quantity of transmission layers, and an index of the precoding matrix, and the precoding matrix is uniquely determined by using both the value of the quantity of transmission layers and the index of the precoding matrix. For example, when the value of the quantity of transmission layers is 1, an index 1 indicates a matrix A; or when the value of the quantity of transmission layers is 2, the index 1 indicates a matrix B. Therefore, the precoding matrix is uniquely determined by using both the value of the quantity of transmission layers and the index of the precoding matrix.

With reference to the first aspect, in a second possible implementation of the first aspect, the current coherence capability is one of the following capabilities:

"fully coherent";
"partial-coherent"; and
"incoherent".

With reference to the second possible implementation of the first aspect, a transmission parameter entry set corresponding to each coherence capability includes at least one transmission parameter entry, and a transmission parameter entry set corresponding to "incoherent" is a subset of a transmission parameter entry set corresponding to "partial-coherent", and the transmission parameter entry set corresponding to "partial-coherent" is a subset of a transmission parameter entry set corresponding to "fully coherent".

With reference to the first aspect, in a third possible implementation of the first aspect, the method further includes:

generating coherence capability indication information, wherein the coherence capability indication information is used to indicate the current coherence capability. One of the three coherence capabilities may be sent through RRC signaling before the transmission parameter indication information is generated.

With reference to the first aspect or the first to the third possible implementations of the first aspect, in a fourth possible implementation of the first aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | | |
| ... | ... | ... | ... | | |
| 19 | One layer: TPMI = 11 | 19 | One layer: TPMI = 11 | | |
| 20 | Two layers: TPMI = 6 | 20 | Two layers: TPMI = 6 | | |
| ... | ... | ... | ... | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| ... | ... | | | | |
| 47 | One layer: TPMI = 27 | | | | |
| 48 | Two layers: TPMI = 14 | | | | |
| ... | ... | | | | |
| 55 | Two layers: TPMI = 21 | | | | |
| 56 | Three layers: TPMI = 3 | | | | |
| ... | ... | | | | |

-continued

| Field index | Fully coherent transmission | Field index | Partially coherent transmission | Field index | Incoherent transmission |
|---|---|---|---|---|---|
| 59 | Three layers: TPMI = 6 | | | | |
| 60 | Four layers: TPMI = 3 | | | | |
| 61 | Four layers: TPMI = 4 | | | | |

With reference to the first aspect or the first to the fourth possible implementations of the first aspect, in a fifth possible implementation of the first aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| | | | | 4 | Two layers: TPMI = 0 |
| 11 | One layer: TPMI = 11 | 11 | One layer: TPMI = 11 | ... | ... |
| | | 12 | Two layers: TPMI = 0 | 9 | Two layers: TPMI = 5 |
| 27 | One layer: TPMI = 27 | ... | ... | 10 | Three layers: TPMI = 0 |
| 28 | Two layers: TPMI = 0 | 17 | Two layers: TPMI = 5 | 11 | Four layers: TPMI = 0 |
| ... | ... | ... | ... | | |
| 33 | Two layers: TPMI = 5 | 25 | Two layers: TPMI = 13 | | |
| | | 26 | Three layers: TPMI = 0 | | |
| 41 | Two layers: TPMI = 13 | 27 | Three layers: TPMI = 1 | | |
| ... | ... | ... | ... | | |
| 49 | Two layers: TPMI = 21 | 29 | Four layers: TPMI = 0 | | |
| 50 | Three layers: TPMI = 0 | 30 | Four layers: TPMI = 1 | | |
| 51 | Three layers: TPMI = 1 | 31 | Four layers: TPMI = 2 | | |
| ... | ... | | | | |
| 53 | Three layers: TPMI = 3 | | | | |
| ... | ... | | | | |
| 56 | Three layers: TPMI = 6 | | | | |
| 57 | Four layers: TPMI = 0 | | | | |
| 58 | Four layers: TPMI = 1 | | | | |
| ... | ... | | | | |
| 60 | Four layers: TPMI = 3 | | | | |
| 61 | Four layers: TPMI = 4 | | | | |

According to a second aspect, a transmission parameter indication method is provided, including:

receiving transmission parameter indication information, wherein the transmission parameter indication information is used to indicate a transmission parameter entry selected from a transmission parameter entry set corresponding to a current coherence capability, and the transmission parameter entry is used to indicate a quantity of transmission layers and a precoding matrix; and determining the quantity of transmission layers and the precoding matrix according to the transmission parameter indication information.

With reference to the second aspect, in a first possible implementation of the second aspect, the transmission parameter entry includes an index of the transmission parameter entry, a value of the quantity of transmission layers, and an index of the precoding matrix, and the precoding matrix is uniquely determined by using both the value of the quantity of transmission layers and the index of the precoding matrix.

With reference to the second aspect, in a second possible implementation of the second aspect, the current coherence capability is one of the following capabilities:

"fully coherent";
"partial-coherent"; and
"incoherent".

With reference to the second possible implementation of the second aspect, a transmission parameter entry set corresponding to each coherence capability includes at least one transmission parameter entry, a transmission parameter entry set corresponding to "incoherent" is a subset of a transmission parameter entry set corresponding to "partial-coherent", and the transmission parameter entry set corresponding to "partial-coherent" is a subset of a transmission parameter entry set corresponding to "fully coherent".

With reference to the second aspect, in a third possible implementation of the second aspect, the method further includes:

generating coherence capability indication information, wherein the coherence capability indication information is used to indicate the current coherence capability.

With reference to the second aspect or the first to the third possible implementations of the second aspect, in a fourth possible implementation of the second aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | | |
| ... | ... | ... | ... | | |
| 19 | One layer: TPMI = 11 | 19 | One layer: TPMI = 11 | | |
| 20 | Two layers: TPMI = 6 | 20 | Two layers: TPMI = 6 | | |
| ... | ... | ... | ... | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |

| Field index | Fully coherent transmission | Field index | Partially coherent transmission | Field index | Incoherent transmission |
|---|---|---|---|---|---|
| 31 | Four layers: TPMI = 2 | 31 | Four layers: TPMI = 2 | | |
| 32 | One layer: TPMI = 12 | | | | |
| ... | ... | | | | |
| 47 | One layer: TPMI = 27 | | | | |
| 48 | Two layers: TPMI = 14 | | | | |
| ... | ... | | | | |
| 55 | Two layers: TPMI = 21 | | | | |
| 56 | Three layers: TPMI = 3 | | | | |
| ... | ... | | | | |
| 59 | Three layers: TPMI = 6 | | | | |
| 60 | Four layers: TPMI = 3 | | | | |
| 61 | Four layers: TPMI = 4 | | | | |

With reference to the second aspect or the first to the fourth possible implementations of the second aspect, in a fifth possible implementation of the second aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| | | | | 4 | Two layers: TPMI = 0 |
| 11 | One layer: TPMI = 11 | 11 | One layer: TPMI = 11 | | ... |
| | ... | 12 | Two layers: TPMI = 0 | 9 | Two layers: TPMI = 5 |
| 27 | One layer: TPMI = 27 | | ... | 10 | Three layers: TPMI = 0 |
| 28 | Two layers: TPMI = 0 | 17 | Two layers: TPMI = 5 | 11 | Four layers: TPMI = 0 |
| ... | ... | ... | ... | | |
| 33 | Two layers: TPMI = 5 | 25 | Two layers: TPMI = 13 | | |
| | ... | 26 | Three layers: TPMI = 0 | | |
| 41 | Two layers: TPMI = 13 | 27 | Three layers: TPMI = 1 | | |
| ... | ... | ... | ... | | |
| 49 | Two layers: TPMI = 21 | 29 | Four layers: TPMI = 0 | | |
| 50 | Three layers: TPMI = 0 | 30 | Four layers: TPMI = 1 | | |
| 51 | Three layers: TPMI = 1 | 31 | Four layers: TPMI = 2 | | |
| ... | ... | | | | |
| 53 | Three layers: TPMI = 3 | | | | |
| ... | ... | | | | |
| 56 | Three layers: TPMI = 6 | | | | |
| 57 | Four layers: TPMI = 0 | | | | |
| 58 | Four layers: TPMI = 1 | | | | |
| ... | ... | | | | |
| 60 | Four layers: TPMI = 3 | | | | |
| 61 | Four layers: TPMI = 4 | | | | |

According to a third aspect, an access device is provided, including:

a processing module, configured to generate transmission parameter indication information, wherein the transmission parameter indication information is used to indicate a transmission parameter entry selected from a transmission parameter entry set corresponding to a current coherence capability, and the transmission parameter entry is used to indicate a quantity of transmission layers and a precoding matrix; and a transceiver module, configured to send the transmission parameter indication information.

With reference to the third aspect, in a first possible implementation of the third aspect, the transmission parameter entry includes an index of the transmission parameter entry, a value of the quantity of transmission layers, and an index of the precoding matrix, and the precoding matrix is uniquely determined by using both the value of the quantity of transmission layers and the index of the precoding matrix.

With reference to the third aspect, in a second possible implementation of the third aspect, the current coherence capability is one of the following capabilities:

"fully coherent";
"partial-coherent"; and
"incoherent".

With reference to the second possible implementation of the third aspect, a transmission parameter entry set corresponding to each coherence capability includes at least one transmission parameter entry, and a transmission parameter entry set corresponding to "incoherent" is a subset of a transmission parameter entry set corresponding to "partial-coherent", and the transmission parameter entry set corresponding to "partial-coherent" is a subset of a transmission parameter entry set corresponding to "fully coherent".

With reference to the third aspect, in a third possible implementation of the third aspect, the method further includes:

generating coherence capability indication information, where the coherence capability indication information is used to indicate the current coherence capability.

With reference to the third aspect or the first to the third possible implementations of the third aspect, in a fourth possible implementation of the third aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |

-continued

| Field index | Fully coherent transmission | Field index | Partially coherent transmission | Field index | Incoherent transmission |
|---|---|---|---|---|---|
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | | |
| . . . | . . . | . . . | . . . | | |
| 19 | One layer: TPMI = 11 | 19 | One layer: TPMI = 11 | | |
| 20 | Two layers: TPMI = 6 | 20 | Two layers: TPMI = 6 | | |
| . . . | . . . | . . . | . . . | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| . . . | . . . | | | | |
| 47 | One layer: TPMI = 27 | | | | |
| 48 | Two layers: TPMI = 14 | | | | |
| . . . | . . . | | | | |
| 55 | Two layers: TPMI = 21 | | | | |
| 56 | Three layers: TPMI = 3 | | | | |
| . . . | . . . | | | | |
| 59 | Three layers: TPMI = 6 | | | | |
| 60 | Four layers: TPMI = 3 | | | | |
| 61 | Four layers: TPMI = 4 | | | | |

With reference to the third aspect or the first to the fourth possible implementations of the third aspect, in a fifth possible implementation of the third aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| . . . | . . . | . . . | . . . | . . . | . . . |
| 3 | One layer: TPMI = 3 | 3 | One layer: TPMI = 3 | 3 | One layer: TPMI = 3 |
| . . . | . . . | . . . | . . . | 4 | Two layers: TPMI = 0 |
| 11 | One layer: TPMI = 11 | 11 | One layer: TPMI = 11 | . . . | . . . |
| | | 12 | Two layers: TPMI = 0 | 9 | Two layers: TPMI = 5 |
| 27 | One layer: TPMI = 27 | . . . | . . . | 10 | Three layers: TPMI = 0 |
| 28 | Two layers: TPMI = 0 | 17 | Two layers: TPMI = 5 | 11 | Four layers: TPMI = 0 |
| . . . | . . . | . . . | . . . | | |
| 33 | Two layers: TPMI = 5 | 25 | Two layers: TPMI = 13 | | |
| . . . | . . . | 26 | Three layers: TPMI = 0 | | |
| 41 | Two layers: TPMI = 13 | 27 | Three layers: TPMI = 1 | | |
| . . . | . . . | . . . | . . . | | |
| 49 | Two layers: TPMI = 21 | 29 | Four layers: TPMI = 0 | | |
| 50 | Three layers: TPMI = 0 | 30 | Four layers: TPMI = 1 | | |
| 51 | Three layers: TPMI = 1 | 31 | Four layers: TPMI = 2 | | |
| . . . | . . . | | | | |
| 53 | Three layers: TPMI = 3 | | | | |
| . . . | . . . | | | | |
| 56 | Three layers: TPMI = 6 | | | | |
| 57 | Four layers: TPMI = 0 | | | | |
| 58 | Four layers: TPMI = 1 | | | | |
| . . . | . . . | | | | |
| 60 | Four layers: TPMI = 3 | | | | |
| 61 | Four layers: TPMI = 4 | | | | |

According to a fourth aspect, user equipment is provided, including:

a transceiver module, configured to receive transmission parameter indication information, wherein the transmission parameter indication information is used to indicate a transmission parameter entry selected from a transmission parameter entry set corresponding to a current coherence capability, and the transmission parameter entry is used to indicate a quantity of transmission layers and a precoding matrix; and a processing module, configured to determine the quantity of transmission layers and the precoding matrix according to the transmission parameter indication information.

With the reference to the fourth aspect, in a first possible implementation of the fourth aspect, the transmission parameter entry includes an index of the transmission parameter entry, a value of the quantity of transmission layers, and an index of the precoding matrix, and the precoding matrix is uniquely determined by using both the value of the quantity of transmission layers and the index of the precoding matrix.

With reference to the fourth aspect, in a second possible implementation of the fourth aspect, the current coherence capability is one of the following capabilities:

"fully coherent";

"partial-coherent"; and

"incoherent".

With reference to the second possible implementation of the fourth aspect, a transmission parameter entry set corresponding to each coherence capability includes at least one transmission parameter entry, and a transmission parameter entry set corresponding to "incoherent" is a subset of a transmission parameter entry set corresponding to "partial-coherent", and the transmission parameter entry set corresponding to "partial-coherent" is a subset of a transmission parameter entry set corresponding to "fully coherent".

With reference to the fourth aspect, in a third possible implementation of the fourth aspect, the method further includes:

generating coherence capability indication information, wherein the coherence capability indication information is used to indicate the current coherence capability.

With reference to the fourth aspect or the first to the third possible implementations of the fourth aspect, in a fourth possible implementation of the fourth aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | | |
| ... | ... | ... | ... | | |
| 19 | One layer: TPMI = 11 | 19 | One layer: TPMI = 11 | | |
| 20 | Two layers: TPMI = 6 | 20 | Two layers: TPMI = 6 | | |
| ... | ... | ... | ... | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| ... | ... | | | | |
| 47 | One layer: TPMI = 27 | | | | |
| 48 | Two layers: TPMI = 14 | | | | |
| ... | ... | | | | |
| 55 | Two layers: TPMI = 21 | | | | |
| 56 | Three layers: TPMI = 3 | | | | |
| ... | ... | | | | |
| 59 | Three layers: TPMI = 6 | | | | |
| 60 | Four layers: TPMI = 3 | | | | |
| 61 | Four layers: TPMI = 4 | | | | |

With reference to the fourth aspect or the first to the fourth possible implementations of the fourth aspect, in a fifth possible implementation of the fourth aspect, the transmission parameter indication information is as follows:

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| ... | ... | ... | ... | 4 | Two layers: TPMI = 0 |
| 11 | One layer: TPMI = 11 | 11 | One layer: TPMI = 11 | ... | ... |
| ... | ... | 12 | Two layers: TPMI = 0 | 9 | Two layers: TPMI = 5 |
| 27 | One layer: TPMI = 27 | ... | ... | 10 | Three layers: TPMI = 0 |
| 28 | Two layers: TPMI = 0 | 17 | Two layers: TPMI = 5 | 11 | Four layers: TPMI = 0 |
| ... | ... | ... | ... | | |
| 33 | Two layers: TPMI = 5 | 25 | Two layers: TPMI = 13 | | |
| ... | ... | 26 | Three layers: TPMI = 0 | | |
| 41 | Two layers: TPMI = 13 | 27 | Three layers: TPMI = 1 | | |
| ... | ... | ... | ... | | |
| 49 | Two layers: TPMI = 21 | 29 | Four layers: TPMI = 0 | | |
| 50 | Three layers: TPMI = 0 | 30 | Four layers: TPMI = 1 | | |
| 51 | Three layers: TPMI = 1 | 31 | Four layers: TPMI = 2 | | |
| ... | ... | | | | |
| 53 | Three layers: TPMI = 3 | | | | |
| ... | ... | | | | |
| 56 | Three layers: TPMI = 6 | | | | |
| 57 | Four layers: TPMI = 0 | | | | |
| 58 | Four layers: TPMI = 1 | | | | |
| ... | ... | | | | |
| 60 | Four layers: TPMI = 3 | | | | |
| 61 | Four layers: TPMI = 4 | | | | |

DESCRIPTION OF EMBODIMENTS

Figure 1:
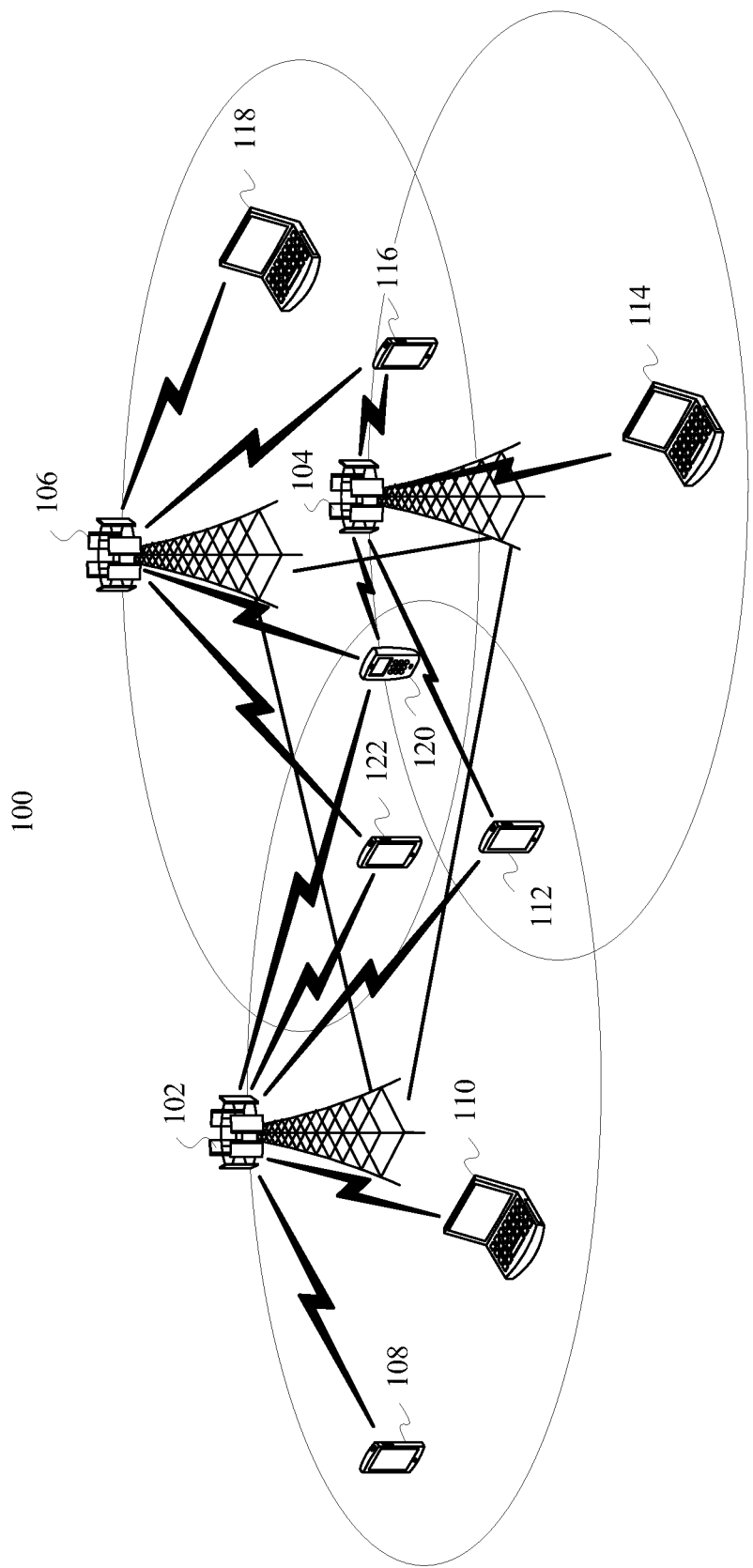
FIG. 1 is an example schematic diagram of a wireless communications network according to an embodiment of the present invention.

A next-generation wireless communications system currently in the research and development phase may also be referred to as a New Radio (NR) system or a 5G system. The latest research shows that the next-generation wireless communications standard supports semi-static channel measurement, and CSI obtained through semi-static channel measurement may be transmitted by using a physical uplink shared channel (PUSCH). In supporting semi-static channel measurement, one of problems to be resolved first is how to notify user equipment to start and stop semi-static channel measurement. Embodiments of the present invention provide a technical solution, which helps resolve the foregoing problem. The following describes the technical solutions provided in the embodiments of the present invention with reference to accompanying drawings and specific embodiments.

The embodiments of the present invention provide a communications device, and the communications device may be configured to implement the access device, or may be configured to implement the user equipment. The communications device includes a processor and a transceiver. The processor is configured to execute an operation of the processing module, and the transceiver is configured to execute an operation executed by the transceiver module.

In a specific implementation process, the processor may be configured to perform, by way of example but not limitation, baseband-related processing, and the transceiver may be configured to perform, by way of example but not limitation, radio frequency transmission/reception. The foregoing components may be separately disposed on mutually independent chips, or some or all of the foregoing components may be disposed on one chip. For example, the processor may be further classified into an analog baseband processor and a digital baseband processor. The analog baseband processor may be integrated with the transceiver on a same chip, and the digital baseband processor may be disposed on an independent chip. With continuous development of integrated circuit technologies, more components can be integrated on one chip. For example, a digital baseband processor may be integrated with a plurality of application processors (by way of example but not limitation, a graphics processing unit or a multimedia processor) on one chip. Such a chip may be referred to as a system on chip (System on Chip). Whether components are independently disposed on different chips or are disposed on one or more chips in an integrated manner depends on a specific requirement of a product design. Specific implementation forms of the foregoing components are not limited in the embodiments of the present invention.

The embodiments of the present invention further provide a processor, configured to perform the foregoing methods. When these methods are being performed, processes of sending and receiving the information in the foregoing methods may be understood as processes in which the processor outputs the information and receives the input information. Specifically, when outputting the information, the processor outputs the information to the transceiver, so that the transceiver transmits the information. Further, after being output by the processor, the information may be processed in another manner before arriving at the transceiver. Similarly, when the processor receives the input information, the transceiver receives the information and inputs the information into the processor. Further, after the transceiver receives the information, the information may be processed in another manner before being input into the processor.

According to the foregoing principle, for example, the receiving transmission parameter indication information mentioned in the foregoing method may be understood as receiving the input transmission parameter indication information by the processor. For another example, sending the transmission parameter indication information may be understood as outputting the transmission parameter indication information by the processor.

In this way, for operations such as transmission, sending, and reception involving the processor, if there is no special description, or if the operations do not conflict with an actual function or an internal logic of the operations in related description, the operations may be more generally understood as outputting and input-reception operations performed by the processor, instead of transmission, sending, and reception operations directly performed by a radio frequency circuit and an antenna.

In a specific implementation process, the processor may be a dedicated processor performing these methods, or may be a processor that performs these methods by executing a computer instruction in a memory, for example, a general purpose processor. The memory may be a non-transitory (non-transitory) memory, for example, a read-only memory (ROM). The memory may be integrated with the processor on one chip, or the memory and the processor may be separately disposed on different chips. A type of the memory and a manner of disposing the memory and the processor are not limited in the embodiments of the present invention.

According to an embodiment of the present invention, a computer readable storage medium is provided, including an instruction. A computer performs the foregoing methods when the instruction runs on the computer. Further, the computer readable storage medium is a non-transitory computer readable storage medium.

According to a twenty-first aspect of the embodiments of the present invention, a computer program product that includes an instruction is provided. A computer performs the foregoing methods when the instruction runs on the computer.

FIG. 1 is an example schematic diagram of a wireless communications network 100 according to an embodiment of the present invention. As shown in FIG. 1, the wireless communications network 100 includes base stations 102 to 106 and terminal devices 108 to 122. The base stations 102 to 106 may communicate with each other by using backhaul (backhaul) links (shown by straight lines between the base stations 102 to 106). The backhaul link may be a wired backhaul link (for example, an optical fiber and a copper wire) or a wireless backhaul link (for example, microwave). The terminal devices 108 to 122 may communicate with the corresponding base stations 102 to 106 by using wireless links (shown by broken lines between the base stations 102 to 106 and the terminal devices 108 to 122).

The base stations 102 to 106 usually serve as access devices to provide a wireless access service for the terminal devices 108 to 122 that usually serve as user equipment. Specifically, each base station is corresponding to a service coverage area (also referred to as a cell, as shown by elliptical areas in FIG. 1), and a terminal device entering the area may communicate with the base station by using a radio signal, so as to get a wireless access service provided by the base station. Service coverage areas of the base stations may overlap, and a terminal device in an overlapping area may receive radio signals from a plurality of base stations. Therefore, the base stations may cooperate with each other to provide services for the terminal device. For example, the plurality of base stations may provide a service for the terminal device in the overlapping area by using a coordinated multipoint transmission/reception (CoMP) technology. For example, as shown in FIG. 1, service coverage areas of the base station 102 and the base station 104 have an overlapping area and a terminal device 112 is located in the overlapping area. Therefore, the terminal device 112 may receive a radio signal from each of the base station 102 and the base station 104. The base station 102 and the base station 104 may cooperate with each other to provide a service for the terminal device 112. For another example, as shown in FIG. 1, service coverage areas of the base station 102, the base station 104, and the base station 106 have a common overlapping area and a terminal device 120 is located in the overlapping area. Therefore, the terminal device 120 may receive a radio signal from each of the base stations 102, 104, and 106. The base stations 102, 104, and 106 cooperate with each other to provide a service for the terminal device 120.

The base station may also be referred to as a Node B (NodeB), an evolved NodeB (evolved NodeB, eNodeB), an access point (AP), or the like, depending on which wireless communications technology is used. Alternatively, based on a size of a provided service coverage area, the base stations may be classified into a macro base station configured to provide a macro cell (Macro cell), a micro base station configured to provide a pico cell (Pico cell), and a femto base station configured to provide a femto cell (Femto cell). With continuous evolution of wireless communications technologies, a future base station may use another name.

The terminal devices 108 to 122 may be various wireless communications devices that have a wireless communication function, by way of example but not limitation, a mobile cellular phone, a cordless telephone, a personal digital assistant (Personal Digital Assistant, PDA), a smartphone, a notebook computer, a tablet computer, a wireless data card, a wireless modem (Modem), or a wearable device such as a smart watch. With emergence of an internet of things (IoT) technology and a vehicle-to-everything (V2X) technology, more devices without a communication function before, by way of example but not limitation, a home appliance, a transportation vehicle, a tool device, a service device, and a service facility, start to configure a wireless communications unit to obtain a wireless communication function, so as to access a wireless communications network and be remotely controlled. Such a device configured with a wireless communications unit has a wireless communication function, and therefore belongs to a wireless communications device. In addition, the terminal devices 108 to 122 may also be referred to as a mobile station, a mobile device, a mobile terminal, a wireless terminal, a handheld device, a client, and the like.

Each of the base stations 102 to 106 and the terminal devices 108 to 122 can be configured with a plurality of antennas, so as to support a multiple-input multiple-output (MIMO) technology. Further, the base stations 102 to 106 and the terminal devices 108 to 122 may support a single-user MIMO (Single-User MIMO, SU-MIMO) technology, or may support multi-user MIMO (Multi-User MIMO, MU-MIMO). The MU-MIMO may be implemented based on a space division multiple access (SDMA) technology. Because a plurality of antennas are configured, the base stations 102 to 106 and the terminal devices 108 to 122 may also flexibly support a single-input single-output (SISO) technology, a single-input multiple-output (SIMO) technology, and a multiple-input single-output (MISO) technology, so as to implement various diversity technologies (by way of example but not limitation, a transmit diversity and a receive diversity) and multiplexing technologies. The diversity technology may include but is not limited to a transmit diversity (TD) technology and a receive diversity (RD) technology. The multiplexing technology may be a spatial multiplexing (Spatial Multiplexing) technology. The foregoing technologies may further include multiple implementation solutions. For example, the transmit diversity technology may include, by way of example but not limitation, a space time transmit diversity (STTD), a space-frequency transmit diversity (SFTD), a time switched transmit diversity (TSTD), a frequency switched transmit diversity (FSTD), an orthogonal transmit diversity (OTD), a cyclic delay diversity (CDD), and another diversity manner, and may further include a diversity manner derived from, evolving from, or combining any of the foregoing diversity manners. For example, currently, an long term evolution (LTE) standard uses a transmit diversity manner such as space time block coding (STBC), a space frequency block coding (SFBC), and the CDD. The transmit diversity is generally described above by using examples. A person skilled in the art should understand that the transmit diversity further includes implementations other than the foregoing examples. Therefore, the foregoing description should not be construed as a limitation on the technical solutions of the present invention. The technical solutions of the present invention should be understood as applicable to various possible transmit diversity solutions.

In addition, the base stations 102 to 106 and the terminal devices 108 to 122 may communicate with each other by using various wireless communications technologies, by way of example but not limitation, a Time Division Multiple Access (TDMA) technology, a Frequency Division Multiple Access (FDMA) technology, a Code Division Multiple Access (CDMA) technology, Time Division-Synchronous Code Division Multiple Access (TD-SCDMA), an orthogonal frequency division multiple access (OFDMA) technology, a single carrier frequency division multiple access (SC-FDMA) technology, a space division multiple access (SDMA) technology, and a technology evolving or derived from these technologies. The foregoing wireless communications technologies are used in many wireless communications standards as a radio access technology (RAT), thereby constructing various well-known wireless communications systems (or networks), including but not limited to Global System for Mobile Communications (GSM), CDMA 2000, wideband CDMA (WCDMA), WiFi defined in a series of 802.22 standards, Worldwide Interoperability for Microwave Access (WWiMAX), LTE, LTE-Advanced (LTE-A), a system evolving from these wireless communications systems, and the like. Unless otherwise specified, the technical solutions provided in the embodiments of the present invention may be applied to the foregoing wireless communications technologies and wireless communications systems. In addition, the terms "system" and "network" can be interchanged.

It should be noted that the wireless communications network 100 shown in FIG. 1 is merely used as an example, and is not intended to limit the technical solutions of the present invention. A person skilled in the art should understand that in a specific implementation process, the wireless communications network 100 may further include another device, and may configure quantities of base stations and terminal devices based on a specific requirement.

Figure 2:
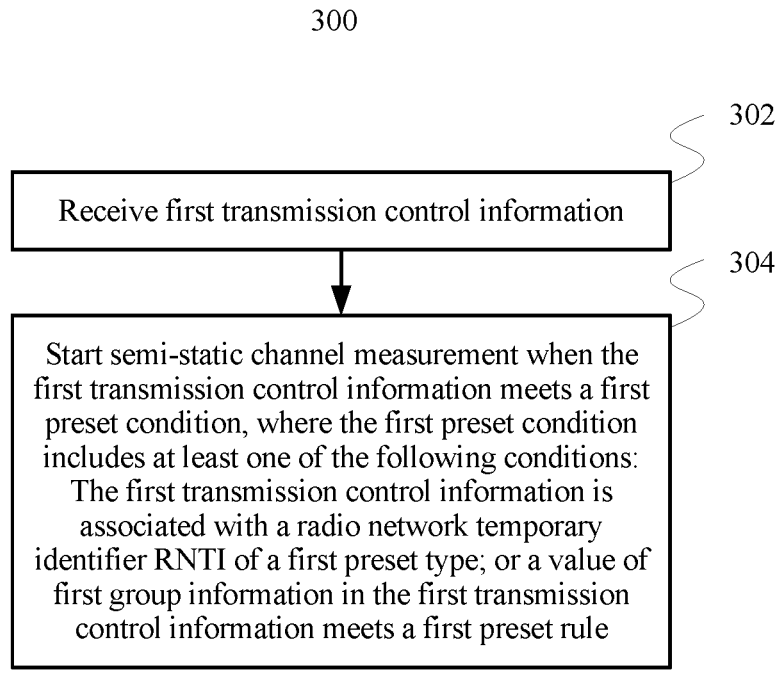
FIG. 2 is an example flowchart of a channel measurement method according to an embodiment of the present invention.

FIG. 2 is an example flowchart of a channel measurement method 300 according to an embodiment of the present invention. In a specific implementation process, the method 300 may be performed by user equipment.

Step 302: Receive transmission parameter indication information, wherein the transmission parameter indication information is used to indicate a transmission parameter entry selected from a transmission parameter entry set corresponding to a current coherence capability, and the transmission parameter entry is used to indicate a quantity of transmission layers and a precoding matrix.

Step 304: Send a transmission parameter indication information.

In Embodiment 1 of the present invention, a state in a field obtained by jointly coding a TRI and a TPMI is used to indicate the TRI and the TPMI used for data transmission. Each TRI value is corresponding to one group of precoding matrices, and the correspondence is shown in Table 1 to Table 4. When a quantity of transmission layers is indicated, a TPMI is used to indicate one precoding matrix selected from a group of precoding matrices corresponding to the quantity of transmission layers. Table 8 is an example of jointly coding a TRI and a TPMI. The indicated quantity of transmission layers, namely, the TRI, is indicated by using a layer x in the table, where a value range of x is {1, 2, 3, 4}. The indicated precoding matrix is indicated by using TPMI=y in the table, where y is a positive integer greater than or equal to 1, and a value range of y is determined based on a quantity of precoding matrices corresponding to three UE capabilities corresponding to each quantity of transmission layers in Table 1 to Table 4. In this embodiment, for each UE capability, indexes of the field obtained by jointly coding the TRI and the TPMI are sorted in an ascending order of ranks. As shown in Table 8, in case of a "fully coherent" transmission capacity, indexes 0 to 27 of the field indicate layer 1 transmission, and each index is corresponding to one precoding matrix index that is corresponding to the layer 1 transmission and that includes a codeword corresponding to "fully coherent", a codeword corresponding to "partially coherent", and a codeword corresponding to "incoherent". Indexes 28 to 49 of the field indicate layer 2 transmission, and each index is corresponding to one precoding matrix index that is corresponding to the layer 2 transmission and that includes a codeword corresponding to "fully coherent", a codeword corresponding to "partially coherent", and a codeword corresponding to "incoherent". Indexes 50 to 56 of the field indicate layer 3 transmission, and each index is corresponding to one precoding matrix index that is corresponding to the layer 3 transmission and that includes a codeword corresponding to "fully coherent", a codeword corresponding to "partially coherent", and a codeword corresponding to "incoherent". Indexes 57 to 61 of the field indicate layer 4 transmission, and each index is corresponding to one precoding matrix index that is corresponding to the layer 4 transmission and that includes a codeword corresponding to "fully coherent", a codeword corresponding to "partially coherent", and a codeword corresponding to "incoherent".

TABLE 8

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| ... | ... | ... | ... | 4 | Two layers: TPMI = 0 |
| 11 | One layer: TPMI = 11 | 11 | One layer: TPMI = 11 | ... | ... |
| ... | ... | 12 | Two layers: TPMI = 0 | 9 | Two layers: TPMI = 5 |
| 27 | One layer: TPMI = 27 | ... | ... | 10 | Three layers: TPMI = 0 |
| 28 | Two layers: TPMI = 0 | 17 | Two layers: TPMI = 5 | 11 | Four layers: TPMI = 0 |
| ... | ... | ... | ... | 12-15 | Reserved |
| 33 | Two layers: TPMI = 5 | 25 | Two layers: TPMI = 13 | | |
| ... | ... | 26 | Three layers: TPMI = 0 | | |
| 41 | Two layers: TPMI = 13 | 27 | Three layers: TPMI = 1 | | |
| ... | ... | ... | ... | | |
| 49 | Two layers: TPMI = 21 | 29 | Four layers: TPMI = 0 | | |
| 50 | Three layers: TPMI = 0 | 30 | Four layers: TPMI = 1 | | |
| 51 | Three layers: TPMI = 1 | 31 | Four layers: TPMI = 2 | | |
| ... | ... | | | | |
| 53 | Three layers: TPMI = 3 | | | | |
| ... | ... | | | | |
| 56 | Three layers: TPMI = 6 | | | | |
| 57 | Four layers: TPMI = 0 | | | | |
| 58 | Four layers: TPMI = 1 | | | | |
| ... | ... | | | | |
| 60 | Four layers: TPMI = 3 | | | | |
| 61 | Four layers: TPMI = 4 | | | | |
| 62-64 | Reserved | | | | |

A signaling indication in Table 8 is corresponding to a case in which the user equipment has four-antenna transmission, a maximum quantity of transmission layers is 4, and a CP-OFDM waveform is used for sending data. When the user equipment has two-antenna transmission, a CP-OFDM waveform is used for sending data, and a maximum quantity of transmission layers is 2, a signaling indication is designed according to the same principle, as shown in Table 9.

TABLE 9

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |
| 2 | One layer: TPMI = 2 | 2 | Two layers: TPMI = 0 |
| ... | ... | 3 | Reserved |
| 5 | One layer: TPMI = 5 | | |
| 6 | Two layers: TPMI = 0 | | |
| ... | ... | | |
| 8 | Two layers: TPMI = 2 | | |
| 9-15 | Reserved | | |

When the user equipment has two-antenna transmission, a CP-OFDM waveform is used for sending data, and a maximum quantity of transmission layers is 1, a signaling indication is designed according to the same principle, as shown in Table 10.

TABLE 10

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |
| 2 | One layer: TPMI = 2 | 2-3 | Reserved |
| ... | ... | | |
| 5 | One layer: TPMI = 5 | | |
| 6-7 | Reserved | | |

When DFT-S-OFDM is used and the user equipment has two-antenna transmission, a TPMI is indicated based on Table 10.

The signaling indication in Table 8 may further be corresponding to a case in which the user equipment has four-antenna transmission, a maximum quantity of transmission layers is 3 or 2, and a CP-OFDM waveform is used for sending data. When the user equipment has four-antenna transmission, a CP-OFDM waveform is used for sending data, and a maximum quantity of transmission layers is 1, a signaling indication is designed according to the same principle, as shown in Table 11.

TABLE 11

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| ... | ... | ... | ... | | |
| 11 | One layer: TPMI = 11 | 11 | One layer: TPMI = 11 | | |
| ... | ... | 12-15 | Reserved | | |
| 27 | One layer: TPMI = 27 | | | | |
| 28-31 | Reserved | | | | |

In Embodiment 2 of the present invention, a state in a field obtained by jointly coding a TRI and a TPMI is used to indicate the TRI and the TPMI used for data transmission. Each TRI value is corresponding to one group of precoding matrices, and the correspondence is shown in Table 1 to Table 4. When a quantity of transmission layers is indicated, a TPMI is used to indicate one precoding matrix selected from a group of precoding matrices corresponding to the quantity of transmission layers. Table 12 is an example of jointly coding a TRI and a TPMI. The indicated quantity of transmission layers, namely, the TRI, is indicated by using a layer x in the table, where a value range of x is {1, 2, 3, 4}. The indicated precoding matrix is indicated by using TPMI=y in the table, where y is a positive integer greater than or equal to 1, and a value range of y is determined based on a quantity of precoding matrices corresponding to three UE capabilities corresponding to each quantity of transmission layers in Table 1 to Table 4. In this embodiment, for partially coherent transmission, indexes of the field start from 0, precoding matrices corresponding to incoherent transmission are preferably sorted, and a sorting order is the same as that of precoding matrix indexes corresponding to the incoherent transmission. Precoding matrix indexes corresponding to the partially coherent transmission are sorted after all the precoding matrix indexes corresponding to the incoherent transmission are sorted. For fully coherent transmission, indexes of the field start from 0, precoding matrices corresponding to incoherent transmission are preferably sorted, and a sorting order is the same as that of precoding matrix indexes corresponding to the incoherent transmission. Precoding matrix indexes corresponding to partially coherent transmission are sorted after all the precoding matrix indexes corresponding to the incoherent transmission are sorted. Precoding matrix indexes corresponding to the fully coherent transmission are sorted after all the precoding matrix indexes corresponding to the incoherent transmission are sorted.

TABLE 12

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | 12-15 | Reserved |
| ... | ... | ... | ... | | |
| 19 | One layer: TPMI = 11 | 19 | One layer: TPMI = 11 | | |
| 20 | Two layers: TPMI = 6 | 20 | Two layers: TPMI = 6 | | |
| ... | ... | ... | ... | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| ... | ... | | | | |
| 47 | One layer: TPMI = 27 | | | | |
| 48 | Two layers: TPMI = 14 | | | | |
| ... | ... | | | | |
| 55 | Two layers: TPMI = 21 | | | | |
| 56 | Three layers: TPMI = 3 | | | | |
| ... | ... | | | | |
| 59 | Three layers: TPMI = 6 | | | | |
| 60 | Four layers: TPMI = 3 | | | | |
| 61 | Four layers: TPMI = 4 | | | | |
| 62-64 | Reserved | | | | |

A signaling indication in Table 12 is corresponding to a case in which the user equipment has four-antenna transmission, a maximum quantity of transmission layers is 4, and a CP-OFDM waveform is used for sending data. When the user equipment has two-antenna transmission, a CP-OFDM waveform is used for sending data, and a maximum quantity of transmission layers is 2, a signaling indication is designed according to the same principle, as shown in Table 13.

TABLE 13

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |
| 2 | Two layers: TPMI = 0 | 2 | Two layers: TPMI = 0 |
| 3 | One layer: TPMI = 2 | 3 | Reserved |
| ... | ... | | |
| 6 | One layer: TPMI = 5 | | |
| 7 | Two layers: TPMI = 1 | | |
| 8 | Two layers: TPMI = 2 | | |
| 9-15 | Reserved | | |

When the user equipment has two-antenna transmission, a CP-OFDM waveform is used for sending data, and a maximum quantity of transmission layers is 1, a signaling indication is designed according to the same principle, as shown in Table 14.

TABLE 14

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |
| 2 | One layer: TPMI = 2 | 2-3 | Reserved |
| ... | ... | | |
| 5 | One layer: TPMI = 5 | | |
| 6-7 | Reserved | | |

When DFT-S-OFDM is used and the user equipment has two-antenna transmission, a TPMI is indicated based on Table 14.

The signaling indication in Table 12 may further be corresponding to a case in which the user equipment has four-antenna transmission, a maximum quantity of transmission layers is 3 or 2, and a CP-OFDM waveform is used for sending data. When the user equipment has four-antenna transmission, a CP-OFDM waveform is used for sending data, and a maximum quantity of transmission layers is 1, a signaling indication is designed according to the same principle, as shown in Table 15.

TABLE 15

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |

TABLE 15-continued

Example of jointly coding a TRI and a TPMI

| Field index | Fully coherent transmission | Field index | Partially coherent transmission | Field index | Incoherent transmission |
|---|---|---|---|---|---|
| 3 | One layer: TPMI = 3 | 3 | One layer: TPMI = 3 | 3 | One layer: TPMI = 3 |
| ... | ... | ... | ... | | |
| 11 | One layer: TPMI = 11 | 11 | One layer: TPMI = 11 | | |
| ... | ... | 12-15 | Reserved | | |
| 27 | One layer: TPMI = 27 | | | | |
| 28-31 | Reserved | | | | |

The technical details in the method 300 are described in detail above with reference to the method 200. Therefore, details are not described herein again.

Figure 3:
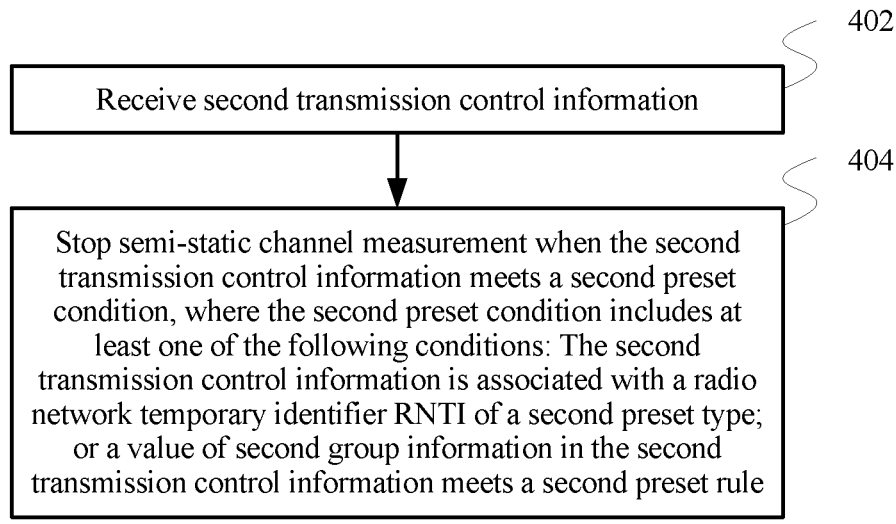
FIG. 3 is an example flowchart of a channel measurement method according to an embodiment of the present invention.

FIG. 3 is an example flowchart of a channel measurement method 400 according to an embodiment of the present invention. In a specific implementation process, the method 400 may be performed by user equipment.

Step 402: Receive transmission parameter indication information.

Step 404: Determine a quantity of transmission layers and a precoding matrix according to the transmission parameter indication information.

In Embodiment 1 of the present invention, a state in a field obtained by jointly coding a TRI and a TPMI is used to indicate the TRI and the TPMI used for data transmission. Each TRI value is corresponding to one group of precoding matrices, and the correspondence is shown in Table 1 to Table 4. When a quantity of transmission layers is indicated, a TPMI is used to indicate one precoding matrix selected from a group of precoding matrices corresponding to the quantity of transmission layers. Table 8 is an example of jointly coding a TRI and a TPMI. The indicated quantity of transmission layers, namely, the TRI, is indicated by using a layer x in the table, where a value range of x is {1, 2, 3, 4}. The indicated precoding matrix is indicated by using TPMI=y in the table, where y is a positive integer greater than or equal to 1, and a value range of y is determined based on a quantity of precoding matrices corresponding to three UE capabilities corresponding to each quantity of transmission layers in Table 1 to Table 4. In this embodiment, for each UE capability, indexes of the field obtained by jointly coding the TRI and the TPMI are sorted in an ascending order of ranks. As shown in Table 8, in case of a "fully coherent" transmission capacity, indexes 0 to 27 of the field indicate layer 1 transmission, and each index is corresponding to one precoding matrix index that is corresponding to the layer 1 transmission and that includes a codeword corresponding to "fully coherent", a codeword corresponding to "partially coherent", and a codeword corresponding to "incoherent". Indexes 28 to 49 of the field indicate layer 2 transmission, and each index is corresponding to one precoding matrix index that is corresponding to the layer 2 transmission and that includes a codeword corresponding to "fully coherent", a codeword corresponding to "partially coherent", and a codeword corresponding to "incoherent". Indexes 50 to 56 of the field indicate layer 3 transmission, and each index is corresponding to one precoding matrix index that is corresponding to the layer 3 transmission and that includes a codeword corresponding to "fully coherent", a codeword corresponding to "partially coherent", and a codeword corresponding to "incoherent". Indexes 57 to 61 of the field indicate layer 4 transmission, and each index is corresponding to one precoding matrix index that is corresponding to the layer 4 transmission and that includes a codeword corresponding to "fully coherent", a codeword corresponding to "partially coherent", and a codeword corresponding to "incoherent".

TABLE 8

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| ... | ... | ... | ... | 4 | Two layers: TPMI = 0 |
| 11 | One layer: TPMI = 11 | 11 | One layer TPMI = 11 | ... | ... |
| ... | ... | 12 | Two layers: TPMI = 0 | 9 | Two layers: TPMI = 5 |
| 27 | One layer TPMI = 27 | ... | ... | 10 | Three layers: TPMI = 0 |
| 28 | Two layers: TPMI = 0 | 17 | Two layers: TPMI = 5 | 11 | Four layers: TPMI = 0 |
| ... | ... | ... | ... | 12-15 | Reserved |
| 33 | Two layers: TPMI = 5 | 25 | Two layers: TPMI = 13 | | |
| ... | ... | 26 | Three layers: TPMI = 0 | | |
| 41 | Two layers: TPMI = 13 | 27 | Three layers: TPMI = 1 | | |
| ... | ... | ... | ... | | |
| 49 | Two layers: TPMI = 21 | 29 | Four layers: TPMI = 0 | | |
| 50 | Three layers: TPMI = 0 | 30 | Four layers: TPMI = 1 | | |
| 51 | Three layers: TPMI = 1 | 31 | Four layers: TPMI = 2 | | |
| ... | ... | | | | |
| 53 | Three layers: TPMI = 3 | | | | |
| ... | ... | | | | |
| 56 | Three layers: TPMI = 6 | | | | |
| 57 | Four layers: TPMI = 0 | | | | |
| 58 | Four layers: TPMI = 1 | | | | |
| ... | ... | | | | |
| 60 | Four layers: TPMI = 3 | | | | |
| 61 | Four layers: TPMI = 4 | | | | |
| 62-64 | Reserved | | | | |

A signaling indication in Table 8 is corresponding to a case in which the user equipment has four-antenna transmission, a maximum quantity of transmission layers is 4, and a CP-OFDM waveform is used for sending data. When the user equipment has two-antenna transmission, a CP-OFDM waveform is used for sending data, and a maximum quantity of transmission layers is 2, a signaling indication is designed according to the same principle, as shown in Table 9.

TABLE 9

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |
| 2 | One layer: TPMI = 2 | 2 | Two layers: TPMI = 0 |
| ... | ... | 3 | Reserved |
| 5 | One layer: TPMI = 5 | | |
| 6 | Two layers: TPMI = 0 | | |
| ... | ... | | |
| 8 | Two layers: TPMI = 2 | | |
| 9-15 | Reserved | | |

When the user equipment has two-antenna transmission, a CP-OFDM waveform is used for sending data, and a maximum quantity of transmission layers is 1, a signaling indication is designed according to the same principle, as shown in Table 10.

TABLE 10

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |
| 2 | One layer: TPMI = 2 | 2-3 | Reserved |
| ... | ... | | |
| 5 | One layer: TPMI = 5 | | |
| 6-7 | Reserved | | |

When DFT-S-OFDM is used and the user equipment has two-antenna transmission, a TPMI is indicated based on Table 10.

The signaling indication in Table 8 may further be corresponding to a case in which the user equipment has four-antenna transmission, a maximum quantity of transmission layers is 3 or 2, and a CP-OFDM waveform is used for sending data. When the user equipment has four-antenna transmission, a CP-OFDM waveform is used for sending data, and a maximum quantity of transmission layers is 1, a signaling indication is designed according to the same principle, as shown in Table 11.

TABLE 11

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| ... | ... | ... | ... | ... | ... |
| 11 | One layer: TPMI = 11 | 11 | One layer: TPMI = 11 | | |
| ... | ... | 12-15 | Reserved | | |
| 27 | One layer: TPMI = 27 | | | | |
| 28-31 | Reserved | | | | |

In Embodiment 2 of the present invention, a state in a field obtained by jointly coding a TRI and a TPMI is used to indicate the TRI and the TPMI used for data transmission. Each TRI value is corresponding to one group of precoding matrices, and the correspondence is shown in Table 1 to Table 4. When a quantity of transmission layers is indicated, a TPMI is used to indicate one precoding matrix selected from a group of precoding matrices corresponding to the quantity of transmission layers. Table 12 is an example of jointly coding a TRI and a TPMI. The indicated quantity of transmission layers, namely, the TRI, is indicated by using a layer x in the table, where a value range of x is {1, 2, 3, 4}. The indicated precoding matrix is indicated by using TPMI=y in the table, where y is a positive integer greater than or equal to 1, and a value range of y is determined based on a quantity of precoding matrices corresponding to three UE capabilities corresponding to each quantity of transmission layers in Table 1 to Table 4. In this embodiment, for partially coherent transmission, indexes of the field start from 0, precoding matrices corresponding to incoherent transmission are preferably sorted, and a sorting order is the same as that of precoding matrix indexes corresponding to the incoherent transmission. Precoding matrix indexes corresponding to the partially coherent transmission are sorted after all the precoding matrix indexes corresponding to the incoherent transmission are sorted. For fully coherent transmission, indexes of the field start from 0, precoding matrices corresponding to incoherent transmission are preferably sorted, and a sorting order is the same as that of precoding matrix indexes corresponding to the incoherent transmission. Precoding matrix indexes corresponding to partially coherent transmission are sorted after all the precoding matrix indexes corresponding to the incoherent transmission are sorted. Precoding matrix indexes corresponding to the fully coherent transmission are sorted after all the precoding matrix indexes corresponding to the incoherent transmission are sorted.

TABLE 12

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | 12-15 | Reserved |
| ... | ... | ... | ... | | |
| 19 | One layer: TPMI = 11 | 19 | One layer: TPMI = 11 | | |
| 20 | Two layers: TPMI = 6 | 20 | Two layers: TPMI = 6 | | |
| ... | ... | ... | ... | | |
| 27 | Two layers: TPMI = 13 | 27 | Two layers: TPMI = 13 | | |
| 28 | Three layers: TPMI = 1 | 28 | Three layers: TPMI = 1 | | |

TABLE 12-continued

Example of jointly coding a TRI and a TPMI

| Field index | Fully coherent transmission | Field index | Partially coherent transmission | Field index | Incoherent transmission |
|---|---|---|---|---|---|
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| ... | ... | | | | |
| 47 | One layer: TPMI = 27 | | | | |
| 48 | Two layers: TPMI = 14 | | | | |
| ... | ... | | | | |
| 55 | Two layers: TPMI = 21 | | | | |
| 56 | Three layers: TPMI = 3 | | | | |
| ... | ... | | | | |
| 59 | Three layers: TPMI = 6 | | | | |
| 60 | Four layers: TPMI = 3 | | | | |
| 61 | Four layers: TPMI = 4 | | | | |
| 62-64 | Reserved | | | | |

A signaling indication in Table 12 is corresponding to a case in which the user equipment has four-antenna transmission, a maximum quantity of transmission layers is 4, and a CP-OFDM waveform is used for sending data. When the user equipment has two-antenna transmission, a CP-OFDM waveform is used for sending data, and a maximum quantity of transmission layers is 2, a signaling indication is designed according to the same principle, as shown in Table 13.

TABLE 13

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |
| 2 | Two layers: TPMI = 0 | 2 | Two layers: TPMI = 0 |
| 3 | One layer: TPMI = 2 | 3 | Reserved |
| ... | ... | | |
| 6 | One layer: TPMI = 5 | | |
| 7 | Two layers: TPMI = 1 | | |
| 8 | Two layers: TPMI = 2 | | |
| 9-15 | Reserved | | |

When the user equipment has two-antenna transmission, a CP-OFDM waveform is used for sending data, and a maximum quantity of transmission layers is 1, a signaling indication is designed according to the same principle, as shown in Table 14.

TABLE 14

Example of jointly coding a TRI and a TPMI

| Field index | Fully coherent transmission | Field index | Incoherent transmission |
|---|---|---|---|
| 0 | One layer: TPMI = 0 | 0 | One layer: TPMI = 0 |
| 1 | One layer: TPMI = 1 | 1 | One layer: TPMI = 1 |

TABLE 14-continued

Example of jointly coding a TRI and a TPMI

| Field index | Fully coherent transmission | Field index | Incoherent transmission |
|---|---|---|---|
| 2 | One layer: TPMI = 2 | 2-3 | Reserved |
| ... | ... | | |
| 5 | One layer: TPMI = 5 | | |
| 6-7 | Reserved | | |

When DFT-S-OFDM is used and the user equipment has two-antenna transmission, a TPMI is indicated based on Table 14.

The signaling indication in Table 12 may further be corresponding to a case in which the user equipment has four-antenna transmission, a maximum quantity of transmission layers is 3 or 2, and a CP-OFDM waveform is used for sending data. When the user equipment has four-antenna transmission, a CP-OFDM waveform is used for sending data, and a maximum quantity of transmission layers is 1, a signaling indication is designed according to the same principle, as shown in Table 15.

TABLE 15

Example of jointly coding a TRI and a TPMI

| Field index | Fully coherent transmission | Field index | Partially coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| ... | ... | ... | ... | | |
| 11 | One layer: TPMI = 11 | 11 | One layer: TPMI = 11 | | |
| ... | ... | 12-15 | Reserved | | |
| 27 | One layer: TPMI = 27 | | | | |
| 28-31 | Reserved | | | | |

The technical details in the method 400 are described in detail above with reference to the method 200. Therefore, details are not described herein again.

Figure 4:
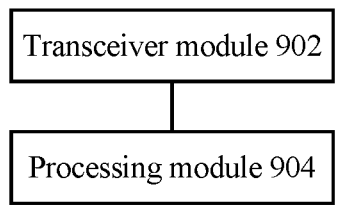
FIG. 4 is an example schematic diagram of a logical structure of a communications device according to an embodiment of the present invention.

FIG. 4 is an example schematic diagram of a logical structure of a communications device 900 according to an embodiment of the present invention. In a specific implementation process, the communications device 900 may be the access device or the user equipment described above. As shown in FIG. 4, the communications device 900 includes a transceiver module 902 and a processing module 904.

When the communications device 900 is the user equipment, the transceiver module 902 may be configured to execute steps 302, 402, and 702, and the processing module 904 is configured to execute steps 304, 404, and 704.

When the communications device 900 is the access device, the transceiver module 902 may be configured to execute steps 504, 604, and 804, and the processing module 904 is configured to execute steps 502, 602, and 802.

Figure 5:
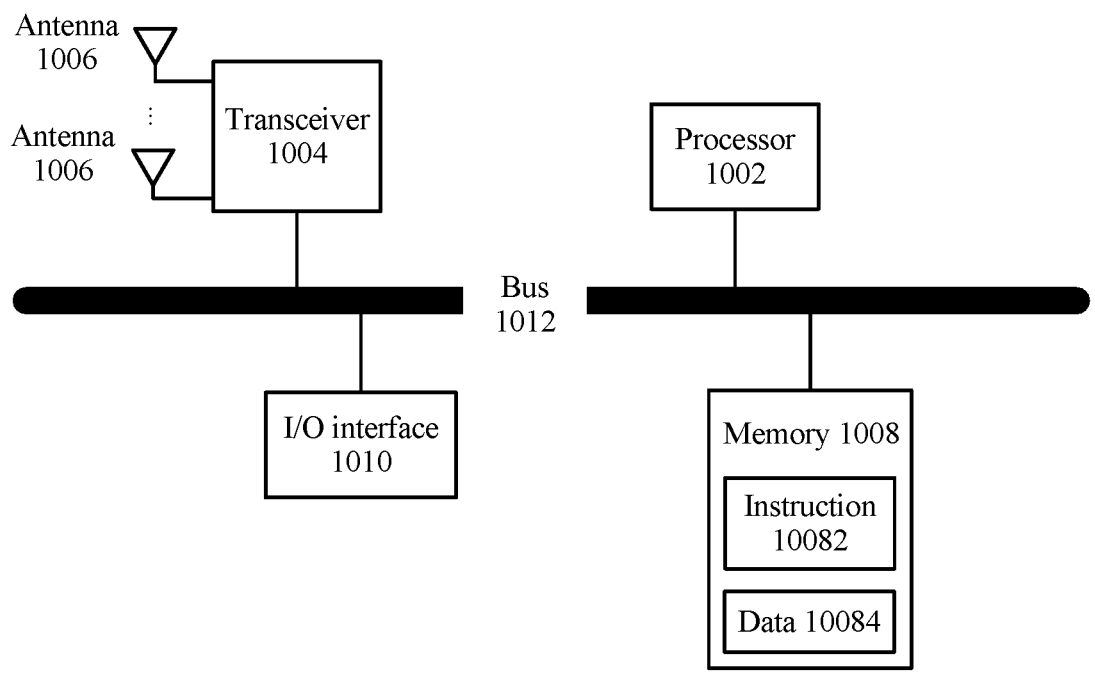
FIG. 5 is an example schematic diagram of a hardware structure of a communications device according to an embodiment of the present invention.

FIG. 5 is an example schematic diagram of a hardware structure of a communications device 1000 according to an embodiment of the present invention. In a specific implementation process, the communications device 1000 may be the access device or the user equipment described above. As shown in FIG. 5, the communications device 1000 includes a processor 1002, a transceiver 1004, a plurality of antennas 1006, a memory 1008, an I/O (input/output, Input/Output) interface 1010, and a bus 1012. The memory 1008 is further configured to store an instruction 10082 and data 10084. In addition, the processor 1002, the transceiver 1004, the memory 1008, and the I/O interface 1010 are communicatively connected to each other by using the bus 1012, and the plurality of antennas 1006 are connected to the transceiver 1004. In a specific implementation process, the processor 1002, the transceiver 1004, the memory 1008, and the I/O interface 1010 may also be communicatively connected to each other in a connection manner other than the bus 1012.

The processor 1002 may be a general processor, by way of example but not limitation, a central processing unit (CPU), or may be a dedicated processor, by way of example but not limitation, a digital signal processor (DSP), an application-specific integrated circuit (ASIC), or a field programmable gate array (FPGA). In addition, the processor 1002 may be a combination of a plurality of processors. The processor 1002 may be a processor particularly designed to perform specific steps and/or operations, or may perform the specific steps and/or operations by reading and executing the instruction 10082 stored in the memory 1008. The processor 1002 may need to use the data 10084 when performing the specific steps and/or operations. Particularly, the processor 1002 is configured to perform an operation performed by the processing module 904.

The transceiver 1004 sends a signal by using at least one antenna in the plurality of antennas 1006, and receives a signal by using at least one antenna in the plurality of antennas 1006. Particularly, the transceiver 1004 is configured to perform an operation performed by the transceiver module 902.

The memory 1008 may include various types of storage media such as a random access memory (RAM), a read-only memory (ROM), a nonvolatile RAM (NVRAM), a programmable ROM (PROM), an erasable PROM (EPROM), an electrically erasable PROM (EEPROM), a flash memory, an optical memory, and a register. The memory 1008 is specifically configured to store the instruction 10082 and the data 10084. The processor 1002 may perform specific steps and/or operations by reading and executing the instruction 10082 stored in the memory 1008, and may need to use the data 10084 when performing the specific operations and/or steps.

The I/O interface 1010 is configured to receive an instruction and/or data from a peripheral device, and output an instruction and/or data to the peripheral device.

It should be noted that in a specific implementation process, the communications device 1000 may further include another hardware component. No further examples are listed one by one in this application.

All or some of the foregoing embodiments may be implemented through software, hardware, firmware, or any combination thereof. When software is used to implement the embodiments, the embodiments may be implemented fully or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (DVD), a semiconductor medium (SSD), or the like.

To sum up, the foregoing descriptions are merely embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A method of wireless communications, comprising:
receiving, by a terminal device, transmission parameter indication information indicating an index in an index set of one codebook subset configuration of three codebook subset configurations in the terminal device from a base station, wherein the three codebook subset configurations in the terminal device are related to fully coherent, partial coherent, and incoherent respectively, wherein each index in the index set is associated with a quantity of transmission layer and a precoding matrix indicator, and a combination of the quantity of transmission layers and the precoding matrix indicator indicates a respective precoding matrix, and an index set of the codebook subset configuration related to fully coherent includes M first indexes, an index set of the codebook subset configuration related to partial coherent includes N second indexes, and an index set of the codebook subset configuration related to incoherent includes K third indexes, M is an integer larger than N, and N is an integer larger than K, wherein a third index and a second index with a same index value are associated with a same quantity of transport layers and a same precoding matrix indicator, and a second index and a first index with a same index value are associated with a same quantity of transport layers and a same precoding matrix indicator, and at least first 12 third indexes are the same as first 12 second indexes, and at least first 32 second indexes are the same as first 32 first indexes, wherein contents of the three codebook subset configurations are represented by the following table:

| Field index | fully coherent transmission | Field index | partial coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| 2 | One layer: TPMI = 2 | 2 | One layer: TPMI = 2 | 2 | One layer: TPMI = 2 |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| 5 | Two layers: TPMI = 1 | 5 | Two layers: TPMI = 1 | 5 | Two layers: TPMI = 1 |
| 6 | Two layers: TPMI = 2 | 6 | Two layers: TPMI = 2 | 6 | Two layers: TPMI = 2 |
| 7 | Two layers: TPMI = 3 | 7 | Two layers: TPMI = 3 | 7 | Two layers: TPMI = 3 |
| 8 | Two layers: TPMI = 4 | 8 | Two layers: TPMI = 4 | 8 | Two layers: TPMI = 4 |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | | |
| 13 | One layer: TPMI = 5 | 13 | One layer: TPMI = 5 | | |
| 14 | One layer: TPMI = 6 | 14 | One layer: TPMI = 6 | | |
| 15 | One layer: TPMI = 7 | 15 | One layer: TPMI = 7 | | |
| 16 | One layer: TPMI = 8 | 16 | One layer: TPMI = 8 | | |
| 17 | One layer: TPMI = 9 | 17 | One layer: TPMI = 9 | | |
| 18 | One layer: TPMI = 10 | 18 | One layer: TPMI = 10 | | |
| 19 | One layer: TPMI = 11 | 19 | One layer: TPMI = 11 | | |
| 20 | Two layers: TPMI = 6 | 20 | Two layers: TPMI = 6 | | |
| 21 | Two layers: TPMI = 7 | 21 | Two layers: TPMI = 7 | | |
| 22 | Two layers: TPMI = 8 | 22 | Two layers: TPMI = 8 | | |
| 23 | Two layers: TPMI = 9 | 23 | Two layers: TPMI = 9 | | |
| 24 | Two layers: TPMI = 10 | 24 | Two layers: TPMI = 10 | | |
| 25 | Two layers: TPMI = 11 | 25 | Two layers: TPMI = 11 | | |
| 26 | Two layers: TPMI = 12 | 26 | Two layers: TPMI = 12 | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| 33 | One layer: TPMI = 13 | | | | |
| 34 | One layer: TPMI = 14 | | | | |
| 35 | One layer: TPMI = 15 | | | | |
| 36 | One layer: TPMI = 16 | | | | |
| 37 | One layer: TPMI = 17 | | | | |
| 38 | One layer: TPMI = 18 | | | | |
| 39 | One layer: TPMI = 19 | | | | |
| 40 | One layer: TPMI = 20 | | | | |
| 41 | One layer: TPMI = 21 | | | | |
| 42 | One layer: TPMI = 22 | | | | |

-continued

| Field index | fully coherent transmission | Field partial coherent index transmission | Field Incoherent index transmission |
|---|---|---|---|
| 43 | One layer: TPMI = 23 | | |
| 44 | One layer: TPMI = 24 | | |
| 45 | One layer: TPMI = 25 | | |
| 46 | One layer: TPMI = 26 | | |
| 47 | One layer: TPMI = 27 | | |
| 48 | Two layers: TPMI = 14 | | |
| 49 | Two layers: TPMI = 14 | | |
| 50 | Two layers: TPMI = 15 | | |
| 51 | Two layers: TPMI = 16 | | |
| 52 | Two layers: TPMI = 17 | | |
| 53 | Two layers: TPMI = 18 | | |
| 54 | Two layers: TPMI = 19 | | |
| 55 | Two layers: TPMI = 20 | | |
| 55 | Two layers: TPMI = 21 | | |
| 56 | Three layers: TPMI = 3 | | |
| 57 | Three layers: TPMI = 4 | | |
| 58 | Three layers: TPMI = 5 | | |
| 59 | Three layers: TPMI = 6 | | |
| 60 | Four layers: TPMI = 3 | | |
| 61 | Four layers: TPMI = 4 | | | determining a transmission layer and precoding matrix associated with the index according to the transmission parameter indication information; and transmitting, by the terminal device, data according to the transmission layer and precoding matrix.

2. The method according to claim 1, wherein length of the transmission parameter indication information is 4 bits, 5 bits or 6 bits depending on which one of the three codebook subset configurations is used in the terminal device.

3. The method according to claim 2, wherein the terminal device receives coherence capability indication information indicating a codebook subset configuration used in the terminal device from the base station.

4. A terminal device, comprising:
at least one processor; and
one or more memories coupled to the at least one processor and storing programming instructions for execution by the at least one processor to cause the terminal device to:
receive transmission parameter indication information indicating an index in an index set of one codebook subset configuration of three codebook subset configurations in the terminal device from a base station, wherein the three codebook subset configurations in the terminal device are related to fully coherent, partial coherent, and incoherent respectively, wherein each index in the index set is associated with a quantity of transmission layer and a precoding matrix indicator, and a combination of the quantity of transmission layers and the precoding matrix indicator indicates a respective precoding matrix, and an index set of the codebook subset configuration related to fully coherent includes M first indexes, an index set of the codebook subset configuration related to partial coherent includes N second indexes, and an index set of the codebook subset configuration related to incoherent includes K third indexes, M is an integer larger than N, and N is an integer larger than K, wherein a third index and a second index with a same index value are associated with a same quantity of transport layers and a same precoding matrix indicator, and a second index and a first index with a same index value are associated with a same quantity of transport layers and a same precoding matrix indicator, and at least first 12 third indexes are the same as first 12 second indexes, and at least first 32 second indexes are the same as first 32 first indexes; determine a transmission layer and precoding matrix associated with the index according to the transmission parameter indication information, wherein contents of the three codebook subset configurations are represented by the following table:

| Field index | fully coherent transmission | Field index | partial coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| 2 | One layer: TPMI = 2 | 2 | One layer: TPMI = 2 | 2 | One layer: TPMI = 2 |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| 5 | Two layers: TPMI = 1 | 5 | Two layers: TPMI = 1 | 5 | Two layers: TPMI = 1 |
| 6 | Two layers: TPMI = 2 | 6 | Two layers: TPMI = 2 | 6 | Two layers: TPMI = 2 |
| 7 | Two layers: TPMI = 3 | 7 | Two layers: TPMI = 3 | 7 | Two layers: TPMI = 3 |
| 8 | Two layers: TPMI = 4 | 8 | Two layers: TPMI = 4 | 8 | Two layers: TPMI = 4 |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | | |
| 13 | One layer: TPMI = 5 | 13 | One layer: TPMI = 5 | | |
| 14 | One layer: TPMI = 6 | 14 | One layer: TPMI = 6 | | |
| 15 | One layer: TPMI = 7 | 15 | One layer: TPMI = 7 | | |
| 16 | One layer: TPMI = 8 | 16 | One layer: TPMI = 8 | | |
| 17 | One layer: TPMI = 9 | 17 | One layer: TPMI = 9 | | |
| 18 | One layer: TPMI = 10 | 18 | One layer: TPMI = 10 | | |
| 19 | One layer: TPMI = 11 | 19 | One layer: TPMI = 11 | | |
| 20 | Two layers: TPMI = 6 | 20 | Two layers: TPMI = 6 | | |
| 21 | Two layers: TPMI = 7 | 21 | Two layers: TPMI = 7 | | |
| 22 | Two layers: TPMI = 8 | 22 | Two layers: TPMI = 8 | | |

-continued

| Field index | fully coherent transmission | Field index | partial coherent transmission | Field index | Incoherent transmission |
|---|---|---|---|---|---|
| 23 | Two layers: TPMI = 9 | 23 | Two layers: TPMI = 9 | | |
| 24 | Two layers: TPMI = 10 | 24 | Two layers: TPMI = 10 | | |
| 25 | Two layers: TPMI = 11 | 25 | Two layers: TPMI = 11 | | |
| 26 | Two layers: TPMI = 12 | 26 | Two layers: TPMI = 12 | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| 33 | One layer: TPMI = 13 | | | | |
| 34 | One layer: TPMI = 14 | | | | |
| 35 | One layer: TPMI = 15 | | | | |
| 36 | One layer: TPMI = 16 | | | | |
| 37 | One layer: TPMI = 17 | | | | |
| 38 | One layer: TPMI = 18 | | | | |
| 39 | One layer: TPMI = 19 | | | | |
| 40 | One layer: TPMI = 20 | | | | |
| 41 | One layer: TPMI = 21 | | | | |
| 42 | One layer: TPMI = 22 | | | | |
| 43 | One layer: TPMI = 23 | | | | |
| 44 | One layer: TPMI = 24 | | | | |
| 45 | One layer: TPMI = 25 | | | | |
| 46 | One layer: TPMI = 26 | | | | |
| 47 | One layer: TPMI = 27 | | | | |
| 48 | Two layers: TPMI = 14 | | | | |
| 49 | Two layers: TPMI = 14 | | | | |
| 50 | Two layers: TPMI = 15 | | | | |
| 51 | Two layers: TPMI = 16 | | | | |
| 52 | Two layers: TPMI = 17 | | | | |
| 53 | Two layers: TPMI = 18 | | | | |
| 54 | Two layers: TPMI = 19 | | | | |
| 55 | Two layers: TPMI = 20 | | | | |
| 55 | Two layers: TPMI = 21 | | | | |
| 56 | Three layers: TPMI = 3 | | | | |
| 57 | Three layers: TPMI = 4 | | | | |
| 58 | Three layers: TPMI = 5 | | | | |
| 59 | Three layers: TPMI = 6 | | | | |
| 60 | Four layers: TPMI = 3 | | | | |
| 61 | Four layers: TPMI = 4 | | | | | and
transmit data according to the transmission layer and precoding matrix.

5. The terminal device according to claim 4, wherein length of the transmission parameter indication information is 4 bits, 5 bits or, 6 bits depending on which one of the three codebook subset configurations is used in the terminal device.

6. The terminal device according to claim 5, wherein the programming instructions, when executed by the at least one processor, cause the terminal device to:
receive coherence capability indication information indicating a codebook subset configuration used in the terminal device from the base station.

7. A non-transitory computer-readable storage medium having instructions recorded thereon which, when executed by at least one processor, cause the at least one processor to perform operations comprising:
receiving transmission parameter indication information indicating an index in an index set of one codebook subset configuration of three codebook subset configurations in a terminal device from a base station, wherein the three codebook subset configurations in the terminal device are related to fully coherent, partial coherent, and incoherent respectively, wherein each index in the index set is associated with a quantity of transmission layer and a precoding matrix indicator, and a combination of the quantity of transmission layers and the precoding matrix indicator indicates a respective precoding matrix, and an index set of the codebook subset configuration related to fully coherent includes M first indexes, an index set of the codebook subset configuration related to partial coherent includes N second indexes, and an index set of the codebook subset configuration related to incoherent includes K third indexes, M is an integer larger than N, and N is an integer larger than K, wherein a third index and a second index with a same index value are associated with a same quantity of transport layers and a same precoding matrix indicator, and a second index and a first index with a same index value are associated with a same quantity of transport layers and a same precoding matrix indicator, and at least first 12 third indexes are the same as first 12 second indexes, and at least first 32 second indexes are the same as first 32 first indexes, wherein contents of the three codebook subset configurations are represented by the following table:

| Field index | fully coherent transmission | Field index | partial coherent transmission | Field index | Incoherent transmission |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |

-continued

| Field index | fully coherent transmission | Field index | partial coherent transmission | Field index | Incoherent transmission |
|---|---|---|---|---|---|
| 2 | One layer: TPMI = 2 | 2 | One layer: TPMI = 2 | 2 | One layer: TPMI = 2 |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| 5 | Two layers: TPMI = 1 | 5 | Two layers: TPMI = 1 | 5 | Two layers: TPMI = 1 |
| 6 | Two layers: TPMI = 2 | 6 | Two layers: TPMI = 2 | 6 | Two layers: TPMI = 2 |
| 7 | Two layers: TPMI = 3 | 7 | Two layers: TPMI = 3 | 7 | Two layers: TPMI = 3 |
| 8 | Two layers: TPMI = 4 | 8 | Two layers: TPMI = 4 | 8 | Two layers: TPMI = 4 |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | | |
| 13 | One layer: TPMI = 5 | 13 | One layer: TPMI = 5 | | |
| 14 | One layer: TPMI = 6 | 14 | One layer: TPMI = 6 | | |
| 15 | One layer: TPMI = 7 | 15 | One layer: TPMI = 7 | | |
| 16 | One layer: TPMI = 8 | 16 | One layer: TPMI = 8 | | |
| 17 | One layer: TPMI = 9 | 17 | One layer: TPMI = 9 | | |
| 18 | One layer: TPMI = 10 | 18 | One layer: TPMI = 10 | | |
| 19 | One layer: TPMI = 11 | 19 | One layer: TPMI = 11 | | |
| 20 | Two layers: TPMI = 6 | 20 | Two layers: TPMI = 6 | | |
| 21 | Two layers: TPMI = 7 | 21 | Two layers: TPMI = 7 | | |
| 22 | Two layers: TPMI = 8 | 22 | Two layers: TPMI = 8 | | |
| 23 | Two layers: TPMI = 9 | 23 | Two layers: TPMI = 9 | | |
| 24 | Two layers: TPMI = 10 | 24 | Two layers: TPMI = 10 | | |
| 25 | Two layers: TPMI = 11 | 25 | Two layers: TPMI = 11 | | |
| 26 | Two layers: TPMI = 12 | 26 | Two layers: TPMI = 12 | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| 33 | One layer: TPMI = 13 | | | | |
| 34 | One layer: TPMI = 14 | | | | |
| 35 | One layer: TPMI = 15 | | | | |
| 36 | One layer: TPMI = 16 | | | | |
| 37 | One layer: TPMI = 17 | | | | |
| 38 | One layer: TPMI = 18 | | | | |
| 39 | One layer: TPMI = 19 | | | | |
| 40 | One layer: TPMI = 20 | | | | |
| 41 | One layer: TPMI = 21 | | | | |
| 42 | One layer: TPMI = 22 | | | | |
| 43 | One layer: TPMI = 23 | | | | |
| 44 | One layer: TPMI = 24 | | | | |
| 45 | One layer: TPMI = 25 | | | | |
| 46 | One layer: TPMI = 26 | | | | |
| 47 | One layer: TPMI = 27 | | | | |
| 48 | Two layers: TPMI = 14 | | | | |
| 49 | Two layers: TPMI = 14 | | | | |
| 50 | Two layers: TPMI = 15 | | | | |
| 51 | Two layers: TPMI = 16 | | | | |
| 52 | Two layers: TPMI = 17 | | | | |
| 53 | Two layers: TPMI = 18 | | | | |
| 54 | Two layers: TPMI = 19 | | | | |
| 55 | Two layers: TPMI = 20 | | | | |
| 55 | Two layers: TPMI = 21 | | | | |
| 56 | Three layers: TPMI = 3 | | | | |
| 57 | Three layers: TPMI = 4 | | | | |
| 58 | Three layers: TPMI = 5 | | | | |
| 59 | Three layers: TPMI = 6 | | | | |
| 60 | Four layers: TPMI = 3 | | | | |
| 61 | Four layers: TPMI = 4; | | | | | determining a transmission layer and precoding matrix associated with the index according to the transmission parameter indication information; and transmitting data according to the transmission layer and precoding matrix.

8. The computer-readable storage medium according to claim 7, wherein length of the transmission parameter indication information is 4 bits, 5 bits, or 6 bits depending on which one of the three codebook subset configurations is used.

* * * * *

UNITED STATES PATENT AND TRADEMARK OFFICE
CERTIFICATE OF CORRECTION

PATENT NO.         : 11,496,198 B2
APPLICATION NO.    : 16/248177
DATED              : November 8, 2022
INVENTOR(S)        : Xianda Liu et al.

It is certified that error appears in the above-identified patent and that said Letters Patent is hereby corrected as shown below:

In the Claims

Column 35 / Line 38 - In Claim 1, delete "4" and insert -- 4; --.

Column 38 / Line 10 - In Claim 4, delete "4" and insert -- 4; --.

Signed and Sealed this
Twenty-fifth Day of April, 2023

Katherine Kelly Vidal
*Director of the United States Patent and Trademark Office*